Feb. 11, 1969  J. B. LEIBEE  3,426,825
ARTICLE OF MANUFACTURE
Filed June 13, 1966
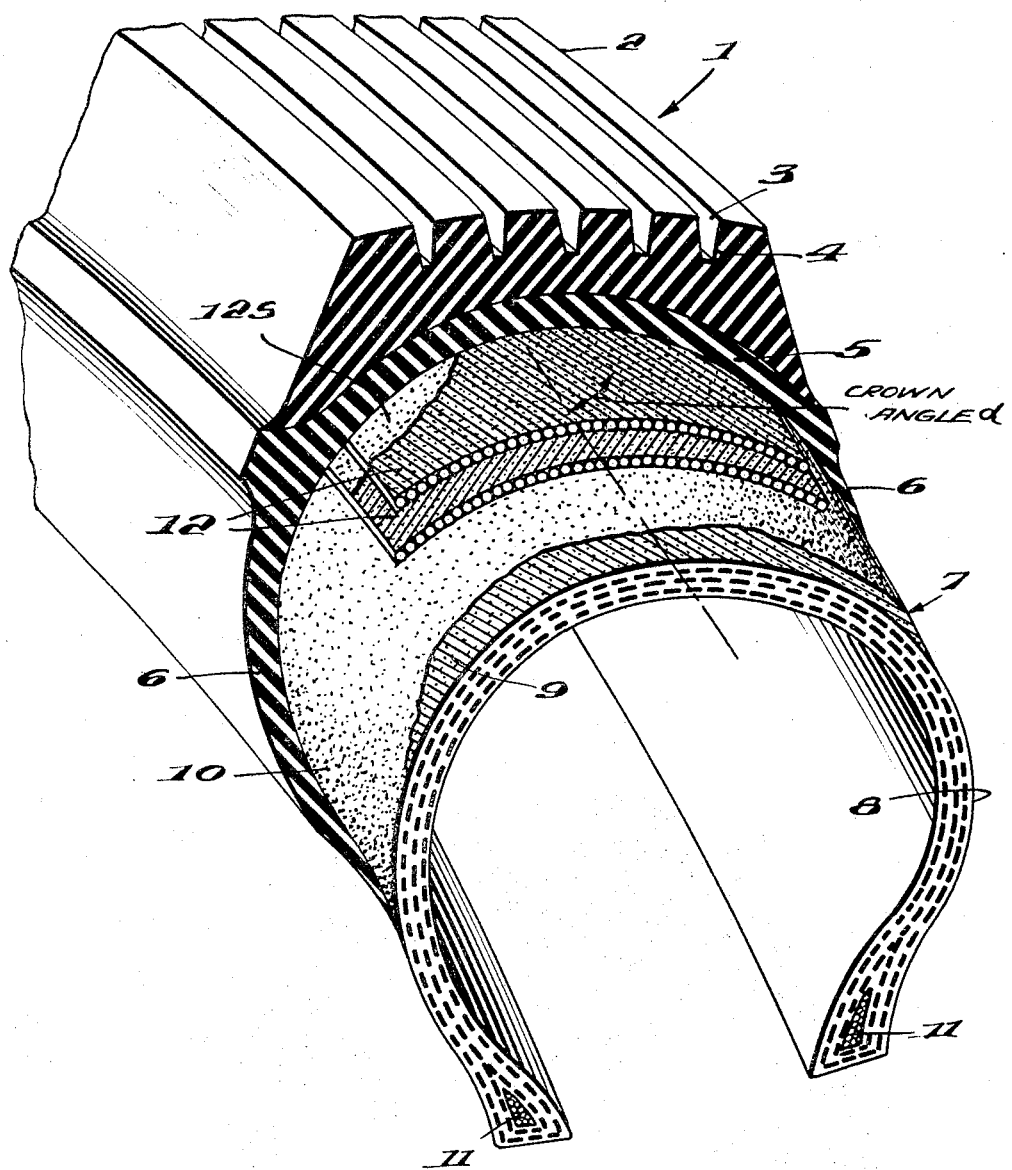

United States Patent Office 3,426,825
Patented Feb. 11, 1969

3,426,825
ARTICLE OF MANUFACTURE
Joseph Bruce Leibee, Westminster, Wilmington, Del., assignor to E. I. du Pont de Nemours and Company, Wilmington, Del., a corporation of Delaware
Filed June 13, 1966, Ser. No. 557,061
U.S. Cl. 152—361    3 Claims
Int. Cl. B60c 9/10

ABSTRACT OF THE DISCLOSURE

A bias construction tire in which a combination of breaker ply features gives exceptional tread wear. Each breaker ply has high modulus textile cords disposed at low breaker crown angles and embedded in high modulus skim stock.

---

This invention relates generally to pneumatic tires and, more particularly, to improvement of their reinforcements.

The carcass of a conventional pneumatic tire is formed of a plurality of superimposed plies of woven fabric or cords, such as textile cords, wires or cables, which lie parallel to each other in any one ply. The plies are disposed on a bias so that the warps of the fabric or the cords of one ply or one group of plies extend in a direction different from that of the warps or cords of an adjacent ply or group of plies. The assembly of carcass plies is embedded in rubber.

At the crown or the tread zone of the tire, outside the carcass, a tread is applied which may be reinforced by one or more textile fabric breaker strips. The tread zone, even when reinforced with conventional fabric breaker strips, is susceptible to deformation by side thrust exerted against the portion of the tread in contact with the ground when a vehicle on which the tire is mounted negotiates a curve. Also, the tread does not resist deformation by the internal transverse forces which are set up when the tire follows a straight course, resulting in an irregular deformation in slippage of that portion of the tread in contact with the road, thereby causing unnecessarily rapid wear of the tire.

One solution to the problem of rapid wear of the tire has been developed in the form of a belted tire construction. In such constructions, cord directions of the carcass and belt plies differ by large angles approaching 90°. At the same time, it has been recognized that such tires give a rough ride, particularly at low speed, because the belt is inextensible and does not permit any substantial envelopment of road irregularities. Belted tire constructions also require special processes in order to assemble the various components, which processes are not adaptable to conventional tire-building apparatus.

Another suggestion to improve the tread wear of tires involves interposing layers of specific elastomers having a modulus of elasticity greater than that of the rubber of the carcass between adjacent plies of the carcass (U.S.P. 3,067,795). Still another suggestion involves use of high modulus cords in at least one breaker strip (U.S.P. 2,782,830).

According to the present invention, both the riding qualities of a bias construction and the longer wearing properties of a belted construction are realized in a pneumatic tire reinforced with carcass plies and at least two breaker plies, the latter plies being comprised of extra high modulus filamentary textile cords embedded in a high modulus skim stock. The breaker cords are disposed at relatively low crown angles of from 18–32° and have a modulus of at least 180 grams/denier. As a criterion, the breaker skim stock must have a 300% elongation modulus of at least 1800 p.s.i.

Additional objectives and advantages will be apparent from the following specification and examples. In the specification, reference is made to the accompanying fragmentary perspective illustration of a representative tire construction.

The illustrated tire 1 includes a vulcanized rubber tread portion 2, having in its surface tread grooves 3 in the form of a desired anti-skid pattern, such grooves extending inwardly from the surface of the tread to a definite depth at their bases 4. Underneath the tread 2, there is provided a sub-tread portion 5 which may be of the same rubber stock as the tread or of a different kind of rubber stock than the tread and which is contiguous at either side of the crown of the tire with laterally and downwardly extending sidewall portions 6 composed of a softer, more flexible rubber stock than the relatively hard and more abrasion resistant tread.

Beneath the sidewall and undertread portions is the carcass 7 constituting the body that imparts strength to the tire. It is made up of a plurality of layers of plies of superimposed rubberized tire fabric 8, which become firmly adhered to each other and to the other rubber covering of the tire during the process of vulcanization.

The tire fabric is made up of a multiplicity of adjacent nylon cords 9, constituting a cord fabric that may either be devoid of any transverse or weft cords, or that contains only an occasional weft cord to maintain the general arrangement during processing. Preparation of the tire fabric by application of a thin calendered coat 10 of rubber carcass stock to each side of a parallel cord fabric is well understood in the art.

Before assembly into a tire, the fabric is cut on a bias to provide strips of the proper length and width, in which the cords run from one side of the fabric piece to the other on a bias at a definite predetermined angle. The bias-cut fabric is then laid on the usual tire-building drum (not shown) and the conventional inextensible bead assemblies 11, typically made up of rubber covered wire wrapped in strips of rubberized fabric, are incorporated in the marginal edges of the carcass by folding the edges of the fabric plies over such assemblies. Thereafter, breaker plies 12, tread 2, and sidewall rubber 6 are applied and the completed assembly is shaped and vulcanized under heat and pressure.

An essential feature of the invention comprises incorporating, under the tread portion of the tire and over the crown portion of the carcass, at least two plies 12 of a breaker fabric which comprises parallelized, high modulus yarns or cords calendared in skim stock 12s having a 300% modulus greater than 1800 p.s.i. The breaker cords have a modulus greater than 180 grams/denier. Such fabric is cut at a bias angle sufficient to provide in the cured tire a relatively low breaker crown angle of 18–32°. As in the carcass plies, cords in succeeding breaker plies are disposed at equal but opposite crown angles.

The cord angle in the finished tire is generally designated at the crown and is indicated in the drawing by the angle α. The crown angle may thus be defined as the lesser angle the cord makes with the circumferential center line of the crowned portion of the tire.

The 300% modulus of rubber and other elastomers is defined as the force necessary to elongate a specimen 300% divided by the initial cross-sectional area of the specimen. It is measured under standard conditions in accordance with the American Society of Testing Materials standard test designated D412–64T.

Cord modulus is determined in accordance with the standard practice defined in ASTM test No. D885–64T.

Composition of the skim stock used in a majority of the exemplified breaker plies is as follows:

Stock A:

| | Parts |
|---|---|
| Smoked sheet | 100 |
| HAF black | 60 |
| Zinc oxide | 5 |
| Stearic acid | 2 |
| Light process oil | 4 |
| "Neozone" A | 1 |
| "Santocure" | 0.5 |
| Sulfur | 2.5 |

"Santocure" is N-cyclohexyl-2-benzothiazole-sulfenamide, an accelerator manufactured by Monsanto Chemical Company.

tread life. When compared to similarly constructed tires made without breaker strips, test tires having but two of the above parameters showed some improvement in tread life.

In the following table, it will be noted that Examples 1, 2, 3 had combinations of the three parameters which showed improved tread life. Examples 4, 5, 6 illustrate tires having a breaker ply constructed with but two of the required parameters. Example 4 incorporated breaker plies with low modulus cords. Example 5 incorporated breaker plies with low rubber skim stock modulus. Example 6 had breaker plies with high crown angles. The tread lives of Examples 4–6 showed appreciably less improvement over the tread life of a tire having no breaker ply (Example 7).

TABLE

| Example number | 1 | 2 | 3 | 4 | 5 | 6 | 7 |
|---|---|---|---|---|---|---|---|
| Breaker Reinforcement: | | | | | | | |
| Fiber | E Glass | E Glass | EHM Rayon | Polyester | E Glass | E Glass | No Breakers. |
| Form | G 150 10/0 Yarn | G 150 10/3 Cord | 1,650/1/2 Cord | 840/2/2 Cord | G 150 10/3 Cord | G 150 10/3 Cord | |
| Denier | 3,000 | 8,400 | 3,200 | 3,300 | 8,400 | 8,400 | |
| Modulus, g.p.d | 250 | 190 | 240 | 100 | 190 | 190 | |
| Green End Count, e.p.i. | 16 | 16 | 27 | 27 | 16 | 16 | |
| Cutting Angle, degrees | 32 | 32 | 32 | 32 | 32 | 28 | |
| No. of breakers | 2 | 2 | 4 | 4 | 2 | 2 | |
| Weight of Reinforcement, pounds. | 0.23 | 0.65 | 0.81 | 0.84 | 0.65 | 0.63 | |
| Cured Crown Angle, degrees | 32 | 30 | 30 | 27 | 30 | 36 | |
| Breaker Skim Stock: | | | | | | | |
| Formula, Stock No | A | A | C | A | B | A | |
| 300% Modulus, p.s.i. | 2,000 | 2,000 | 2,000 est | 2,000 | 1,200 | 2,000 | |
| Cured Carcass Crown Angle, degrees. | 32 | 32 | 33 | 32 | 32 | 38 | 34. |
| Treadwear, mils/10,000 miles | 174 | 168 | 175 | 225 | 194 | 204 | 252. |

The other breaker skim stocks identified below in the table of examples as Stock B and Stock C have the following compositions:

Stock B:

| | Parts |
|---|---|
| Smoked sheets | 50 |
| SBR 1500 | 50 |
| HAF black | 35 |
| Zinc oxide | 3 |
| Stearic acid | 1 |
| Naphthenic oil | 10 |
| Agerite resin D | 1 |
| NOBS Special | 1.25 |
| "MBTS" | .25 |
| Insoluble sulfur | 2.50 |

Stock C:

| | Parts |
|---|---|
| Natural rubber, RSS #1 | 100 |
| APF black, Sterling 105 | 45 |
| Zinc oxide | 5 |
| Stearic acid | 3 |
| Pine tar | 3 |
| Staybelite resin | 3 |
| "Agerite" stalite | 1 |
| "MBTS" | 1 |
| "Thiuram M" | 0.1 |
| Insoluble sulfur, Crystex | 2.75 |

The prefered breaker ply comprises high modulus cords such as glass and extra high modulus rayon cords having a modulus in excess of 180 grams per denier.

Breaker cords in the cured tires should have a crown angle which is less than the carcass crown angle. The carcass crown angle is in the range of from 30–40°, preferably from 30–34°. The high modulus breaker crown angle is in the range of from 18–32°.

The superiority of tires constructed in accordance with the invention was demonstrated by actually testing tires having the breaker constructed with high modulus cords, high modulus breaker skim stock, and cured crown angles in the ranges specified for both the breaker and carcass plies, in comparison with other similarly constructed bias breaker tires having but two of these features. Only those tires having breaker strips with all three of the above parameters were found to have exceptionally improved All of the exemplified tires were made according to the following specifications:

Carcass:

| | |
|---|---|
| Fiber | [1] Polyamide melt blend. |
| Form | 1260/1/2. |
| Green end count, e.p.i. | [2] 27. |
| Cutting angle, ° | [2] 32. |
| Skim stock | Stock B. |
| Tread and sidewalls | SBR/polybutadiene. |
| Mold | 7.75–14. |
| Cure | 325°/66 minutes. |
| Post inflation | 50 p.s.i.g./32 minutes. |
| Cured breaker width | 5 inches. |

[1] As in British No. 918,637.
[2] Except Example 6, which was 29 e.p.i. and 28°.

In order to measure tread life, the exemplified tires were mounted on passenger cars and run on a test track in a fairly normal but controlled way. The change in depth of the outer tread grooves of each tire over the period of the test was divided by the mileage and multiplied by a weighting factor of 0.6 to account for the tread rib area represented. Depth change per mile of the inner grooves was multiplied by a weighting factor of 0.4. Sums of these two weighted measurements have been reported as tread wear in the tables of examples.

The basic elastomers useful in practicing this invention include natural and synthetic rubbers. Representative synthetic rubbers are the butadiene polymers made by polymerizing butadiene alone or with one or more copolymerizable ethylenic unsaturated compounds such as styrene, vinylpyridene, acrylonitrile. Other suitable synthetic rubbers include polymers of chloroprene and copolymers of chloroprene with unsaturated monomers. The elastomeric compounds used in tires will contain additives such as vulcanizing agents, accelerators, softeners, carbon blacks, pigments, antioxidants, and others. The proper selection of these materials and methods of compounding to achieve desired properties in the cured compounds, such as the elongation modulus, are well known.

Having thus described the invention, what is claimed as new and desired to be secured by Letters Patent is:

1. A bias construction pneumatic tire reinforced with carcass plies and at least two breaker plies, the latter comprising extra high modulus textile cords embedded in high modulus skim stock, said high modulus cords being disposed at crown angles of from 18–32° and having a modulus of at least 180 grams/denier, said high modulus stock having a 300% modulus of at least 1800 p.s.i., said carcass plies comprising textile cords disposed at crown angles of from 30–40°.

2. The tire of claim 1 wherein said high modulus breaker cords are disposed at crown angles of about 30° and comprise filaments of a composition selected from the group consisting of rayon and glass.

3. The tire of claim 2 wherein the carcass plies are comprised of nylon cords disposed at crown angles equal to or greater than the breaker crown angles.

References Cited

UNITED STATES PATENTS

| | | | |
|---|---|---|---|
| 2,782,830 | 2/1957 | Wallace | 152—361 XR |
| 2,786,507 | 3/1957 | Howe | 152—361 XR |
| 3,205,931 | 9/1965 | Keefe | 152—361 XR |

FOREIGN PATENTS 1,301,156  7/1962  France.

ARTHUR L. LA POINT, *Primary Examiner.*

C. B. LYON, *Assistant Examiner.*

U.S. Cl. X.R.

152—354